(12) United States Patent
Yamamoto (10) Patent No.: US 11,050,318 B2
(45) Date of Patent: Jun. 29, 2021

(54) DRIVE DEVICE

(71) Applicant: DENSO CORPORATION, Kariya (JP)

(72) Inventor: Naohiro Yamamoto, Kariya (JP)

(73) Assignee: DENSO CORPORATION, Kariya (JP)

( * ) Notice: Subject to any disclaimer, the term of this patent is extended or adjusted under 35 U.S.C. 154(b) by 519 days.

(21) Appl. No.: 16/073,892

(22) PCT Filed: Dec. 26, 2016

(86) PCT No.: PCT/JP2016/088607
§ 371 (c)(1),
(2) Date: Jul. 30, 2018

(87) PCT Pub. No.: WO2017/134959
PCT Pub. Date: Aug. 10, 2017

(65) Prior Publication Data
US 2019/0044406 A1 Feb. 7, 2019

(30) Foreign Application Priority Data
Feb. 1, 2016 (JP) .............................. JP2016-016925

(51) Int. Cl.
| | |
|---|---|
| *H02K 5/10* | (2006.01) |
| *B62D 5/04* | (2006.01) |
| *H02K 11/33* | (2016.01) |
| *H02K 5/22* | (2006.01) |
| *H02K 7/08* | (2006.01) |
| *H02K 3/50* | (2006.01) |
| *H02K 11/21* | (2016.01) |

(52) U.S. Cl.
CPC ............. *H02K 5/10* (2013.01); *B62D 5/0406* (2013.01); *H02K 5/225* (2013.01); *H02K 7/083* (2013.01); *H02K 11/33* (2016.01); *B62D 5/04* (2013.01); *H02K 3/50* (2013.01); *H02K 11/21* (2016.01); *H02K 2211/03* (2013.01)

(58) Field of Classification Search
CPC .......... H02K 5/10; H02K 11/33; H02K 5/225; H02K 7/083; H02K 11/21; H02K 221/03
USPC ............................................................. 310/71
See application file for complete search history.

(56) References Cited

U.S. PATENT DOCUMENTS

| | | | |
|---|---|---|---|
| 2015/0222156 A1 | 8/2015 | Tomizawa et al. | |
| 2015/0236570 A1* | 8/2015 | Hayashi | H02K 11/33 |
| | | | 310/45 |

FOREIGN PATENT DOCUMENTS

| | | |
|---|---|---|
| JP | 2010-041871 A | 2/2010 |
| JP | 2010-263768 A | 11/2010 |
| JP | 2014-138489 A | 7/2014 |

(Continued)

*Primary Examiner* — Terrance L Kenerly
(74) *Attorney, Agent, or Firm* — Maschoff Brennan (57) ABSTRACT

A drive device includes: a cover that is installed to an outer wall of a housing; a control unit that is installed in an inside of the cover; a terminal that extends from the control unit and extends through the cover; and a lead wire that extends from a coil and extends through the housing and the cover. The lead wire is electrically connected to the terminal at an outside of the cover. Therefore, the lead wire and the terminal can be connected together after installation of the cover to the housing. At this time, a lead wire insertion hole is shielded by the cover, and thereby it is possible to limit intrusion of solder debris into an inside of the housing through the lead wire insertion hole.

15 Claims, 8 Drawing Sheets

(56) References Cited

FOREIGN PATENT DOCUMENTS

| JP | 2015-144507 A | 8/2015 |
|----|---------------|--------|
| JP | 2015-154673 A | 8/2015 |

* cited by examiner

DRIVE DEVICE

CROSS REFERENCE TO RELATED APPLICATION

This application is the U.S. national phase of International Application No. PCT/JP2016/088607 filed on Dec. 26, 2016 and is based on and incorporates herein by reference Japanese Patent Application No. 2016-16925 filed on Feb. 1, 2016.

TECHNICAL FIELD

The present disclosure relates to a drive device that includes a motor and a control unit.

BACKGROUND ART

Previously, there is known a drive device that includes: a motor; and a control unit, which is integrated with the motor and controls the motor. In this type of drive device, a housing of the motor has a plurality of through-holes (hereinafter referred to as lead wire insertion holes), through each of which a corresponding lead wire for connecting between a corresponding coil of the motor and the control unit is inserted. In a case where the lead wire insertion hole communicates between an inside and an outside of the housing, foreign objects, which are generated at the time of electrically connecting between the lead wire and the control unit by, for example, soldering, may possibly intrude into the inside of the housing through the lead wire insertion hole. In view of the above disadvantage, the drive device, which is recited in the patent literature 1, includes seal members, each of which closes the corresponding lead wire insertion hole. Each seal member is held between a bottom portion of a bottomed tubular case and a frame end of the housing.

However, the seal member is required only for the purpose of preventing the intrusion of the foreign objects into the inside of the housing at the time of connecting between the lead wire and the control unit, and the seal member is not needed at the time of using the drive device. Therefore, it has been demanded to eliminate the seal members to improve ease of assembly and to reduce the number of components.

CITATION LIST

Patent Literature

PATENT LITERATURE 1: JP2015-144507A (corresponding to US2015/0222156A1)

SUMMARY OF INVENTION

The present disclosure is made in view of the above point, and it is an objective of the present disclosure to provide a drive device that can limit intrusion of foreign objects into an inside of a housing at the time of connection between a lead wire and a control unit without providing a seal member into a lead wire insertion hole of the housing.

A drive device of the present disclosure includes: a housing; a stator that is fixed in an inside of the housing; a rotor that is configured to be rotatable relative to the stator; a cover that is installed to an outer wall of the housing; a control unit that is installed in an inside of the cover and controls energization of a coil of the stator; a terminal that extends from the control unit; and a lead wire that extends from the coil. The terminal extends through the cover. The lead wire extends through the housing and the cover and is electrically connected to the terminal at an outside of the cover.

At the drive device, which is constructed in the above-described manner, the lead wire and the terminal can be connected together by, for example, soldering after installation of the cover to the housing. At the time of connecting the lead wire and the terminal together, the lead wire insertion hole of the housing is shielded by the cover. Therefore, it is possible to limit the intrusion of the foreign objects (e.g., solder debris, which is generated at the time of soldering, or weld spatter, which is generated at the time of welding) into the inside of the housing through the lead wire insertion hole without a need for providing the seal member at the lead wire insertion hole of the housing. Since there is no need to provide the seal member, it is possible to improve the ease of assembly and to reduce the number of components.

BRIEF DESCRIPTION OF DRAWINGS

The present disclosure, together with additional objectives, features and advantages thereof, will be best understood from the following description in view of the accompanying drawings.

DESCRIPTION OF EMBODIMENTS

Hereinafter, embodiments of the present disclosure will be described with reference to the drawings. In the following embodiments, substantially identical structural portions will be indicated by the same reference signs and will not be described redundantly for the sake of simplicity.

First Embodiment

Figure 1:
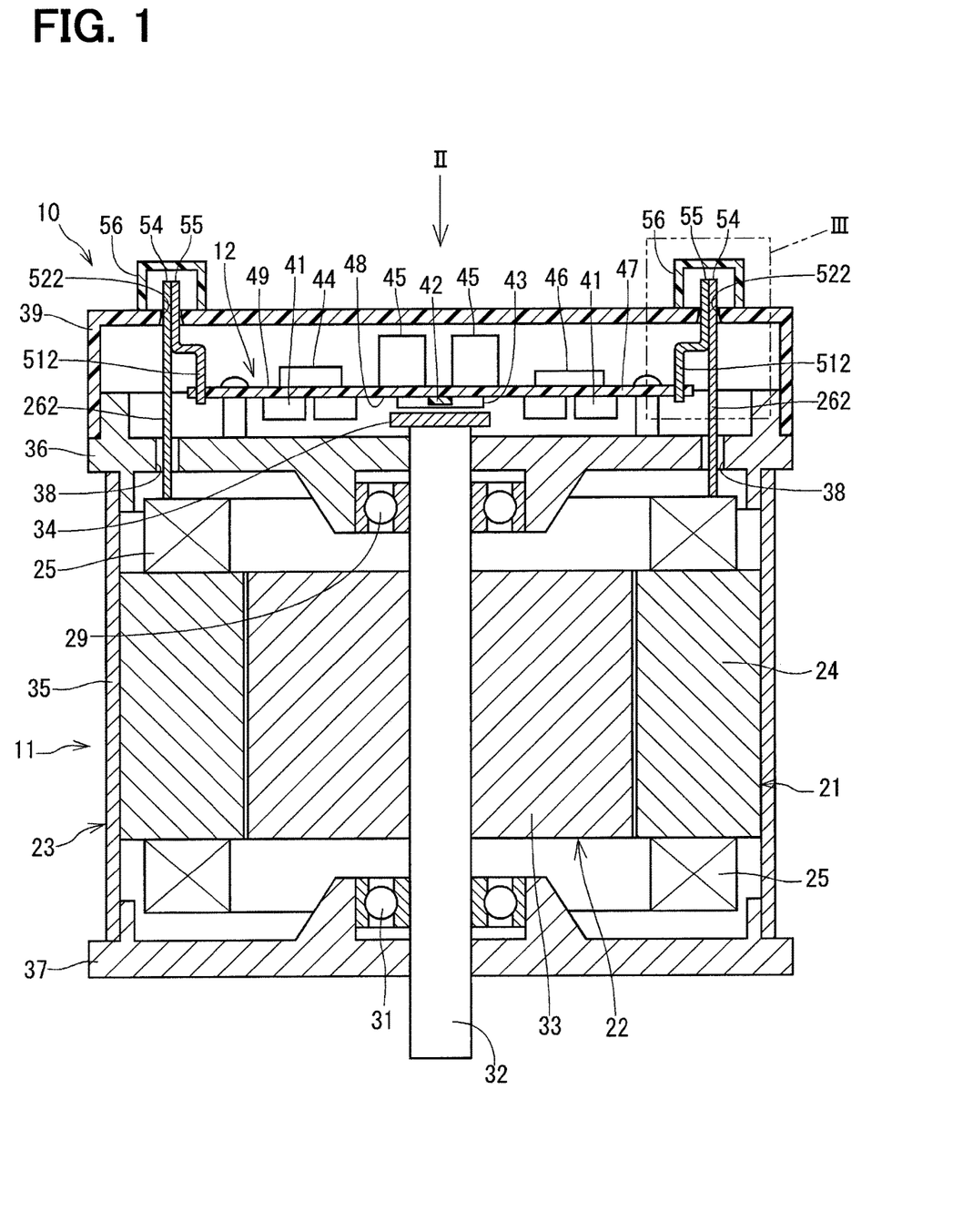
FIG. 1 is a cross-sectional view of a drive device according to a first embodiment of the present disclosure.

FIG. 1 shows a drive device according to a first embodiment of the present disclosure. The drive device 10 is used as a drive source of an electric power steering apparatus that assists a steering operation of a driver of a vehicle.

Figure 2:
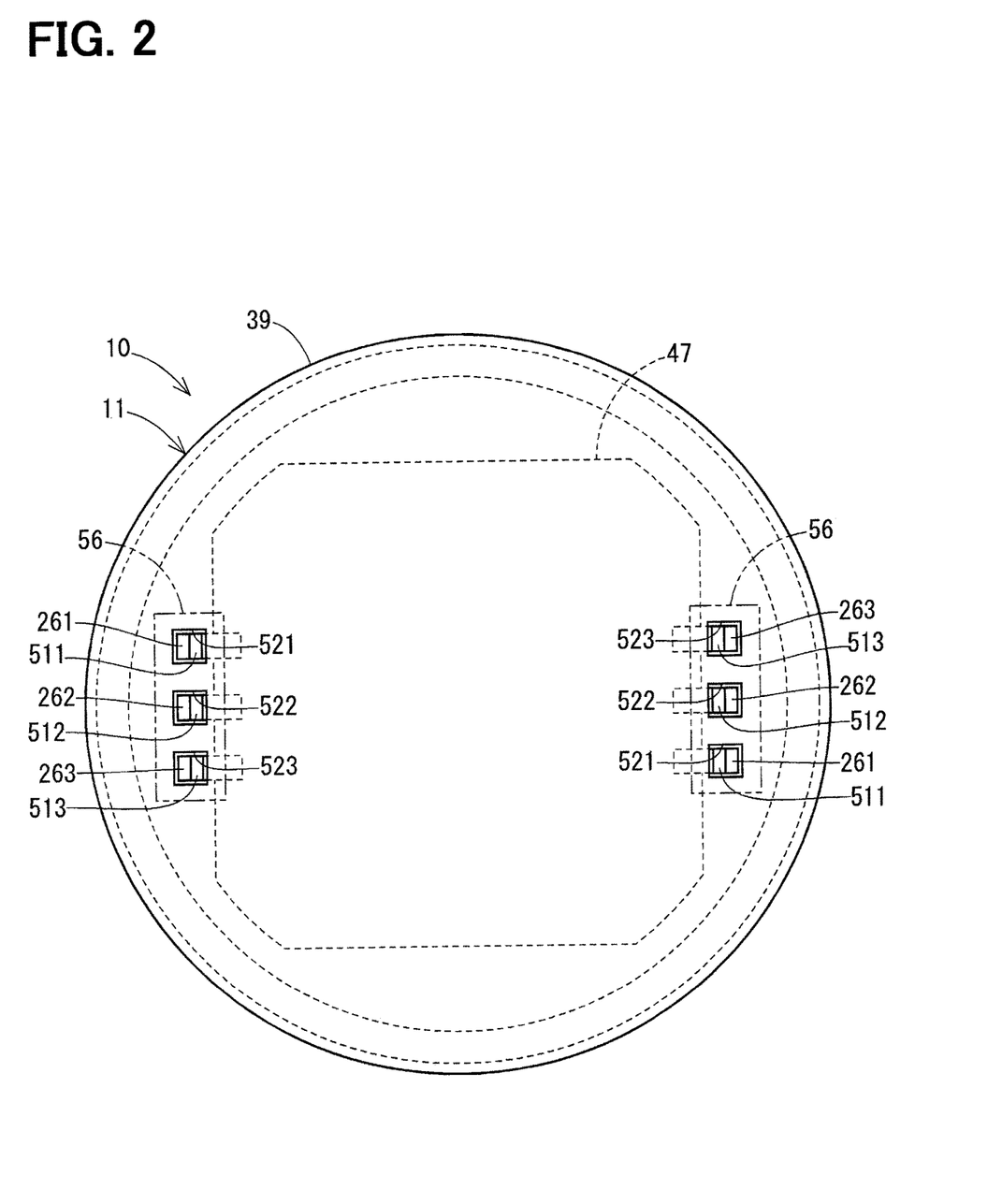
FIG. 2 is a view of the drive device taken in a direction of an arrow II in FIG. 1.

First of all, an overall structure of the drive device 10 will be described with reference to FIGS. 1 and 2.

The drive device 10 is an electromechanical drive device that includes: a motor 11; and a control unit 12, which is integrated with the motor 11 and controls the motor 11.

The motor 11 is a three-phase brushless motor and includes a stator 21; a rotor 22; and a housing 23 that receives the stator 21 and the rotor 22.

The stator 21 includes: a stator core 24 that is fixed in an inside of the housing 23; and two sets of three-phase coils (hereinafter referred to as coils) 25 that are installed to the stator core 24. Each of lead wires 261, 262, 263 extends from a corresponding one of phase windings of the coils 25. Hereinafter, in a case were the lead wires 261, 262, 263 are not distinguished from each other, the lead wires 261, 262, 263 will be merely referred to as lead wires 26.

The rotor 22 includes: a rotatable shaft 32, which is supported by bearings 29, 31; and a rotor core 33, which is fitted to the rotatable shaft 32. The rotor 22 is placed on an inner side of the stator 21 and is rotatable relative to the stator 21. A sensing-subject member 34, which is made of a permanent magnet, is placed at one end of the rotatable shaft 32. The sensing-subject member 34 is used to sense a rotational angle of the rotor 22 through a rotational angle sensor 42 described later.

The housing 23 includes: a case 35, which is configured into a tubular form; a first frame end 36, which is placed at one end of the case 35; and a second frame end 37, which is placed at the other end of the case 35. The first frame end 36 and the second frame end 37 clamp the case 35 therebetween and are fastened together with a plurality of bolts (not shown). The bearing 29 is installed at a center portion of the first frame end 36, and the bearing 31 is installed to a center portion of the second frame end 37. The first frame end 36 includes a plurality of lead wire insertion holes 38, through each of which a corresponding one of the lead wires 26 extend. In the present embodiment, each of the lead wire insertion holes 38 is formed for the corresponding one of the lead wires 26.

A cover 39 is installed to a wall portion of the first frame end 36, which is located at the control unit 12 side and serves as an outer wall of the housing 23. In the present embodiment, the cover 39 is shaped into a cup form. The cover 39 protects the control unit 12 from external shocks and limits intrusion of dust, water or the like to the control unit 12.

The control unit 12 includes: various electronic components 41-46; and a circuit board 47, to which the electronic components 41-46 are installed.

The circuit board 47 is, for example, a printed circuit board and is placed to oppose the first frame end 36. Among two principal surfaces of the circuit board 47, one surface, which is opposed to the first frame end 36, will be referred to as a first principal surface 48, and an opposite surface, which is opposite from the first principal surface 48, will be referred to as a second principal surface 49.

The first principal surface 48 of the circuit board 47 has: a plurality of switching elements 41, which constitute two inverters that respectively correspond to the two sets of coils 25 of the two systems; the rotational angle sensor 42, which senses a position of the rotor 22; and an integrated circuit 43, which outputs a drive signal to the switching elements 41. The rotational angle sensor 42 is opposed to the sensing-subject member 34. The switching elements 41 and the integrated circuit 43 contact the first frame end 36 through thermal gel (not shown) in a state where heat is releasable from the switching elements 41 and the integrated circuit 43 to the first frame end 36. The first frame end 36 also functions as a heat sink.

The second principal surface 49 of the circuit board 47 has: a microcomputer 44, which computes a command value for an electric power to be supplied to the respective phase windings of the coils 13 based on, for example, the position of the rotor 22; capacitors 45, which store electric charge to assist electric power supply to the inverters; and a choke coil 46, which constitutes a filter circuit in cooperation with the capacitors 45.

Terminals 511, 512, 513, which respectively correspond to the lead wires 261, 262, 263, extend from the circuit board 47. Hereinafter, in a case were the terminals 511, 512, 513 are not distinguished from each other, the terminals 511, 512, 513 will be merely referred to as terminals 51. Each terminal 51 is electrically connected to the corresponding lead wire 26 and the circuit board 47 by soldering. The structures of the lead wires 26 and the terminals 51 will be described later.

The drive device 10, which is configured in the above described manner, generates a rotating magnetic field by sequentially energizing the phase windings of the coils 25 based on the measurement signal of the rotational angle sensor 42 to rotate the rotor 22. The control unit 12 of the drive device 10 is installed at a location that is on one side of the motor 11 in an axial direction. Therefore, it is possible to avoid direct application of vibrations of the motor 11 to the control unit 12. Furthermore, the first frame end 36, to which the control unit 12 is fixed, is made by, for example, aluminum die-casting and is precisely formed. Therefore, the positional accuracy of the control unit 12 and the motor 11 can be substantially improved, and the heat generated from the control unit 12 can be effectively released.

Figure 3:
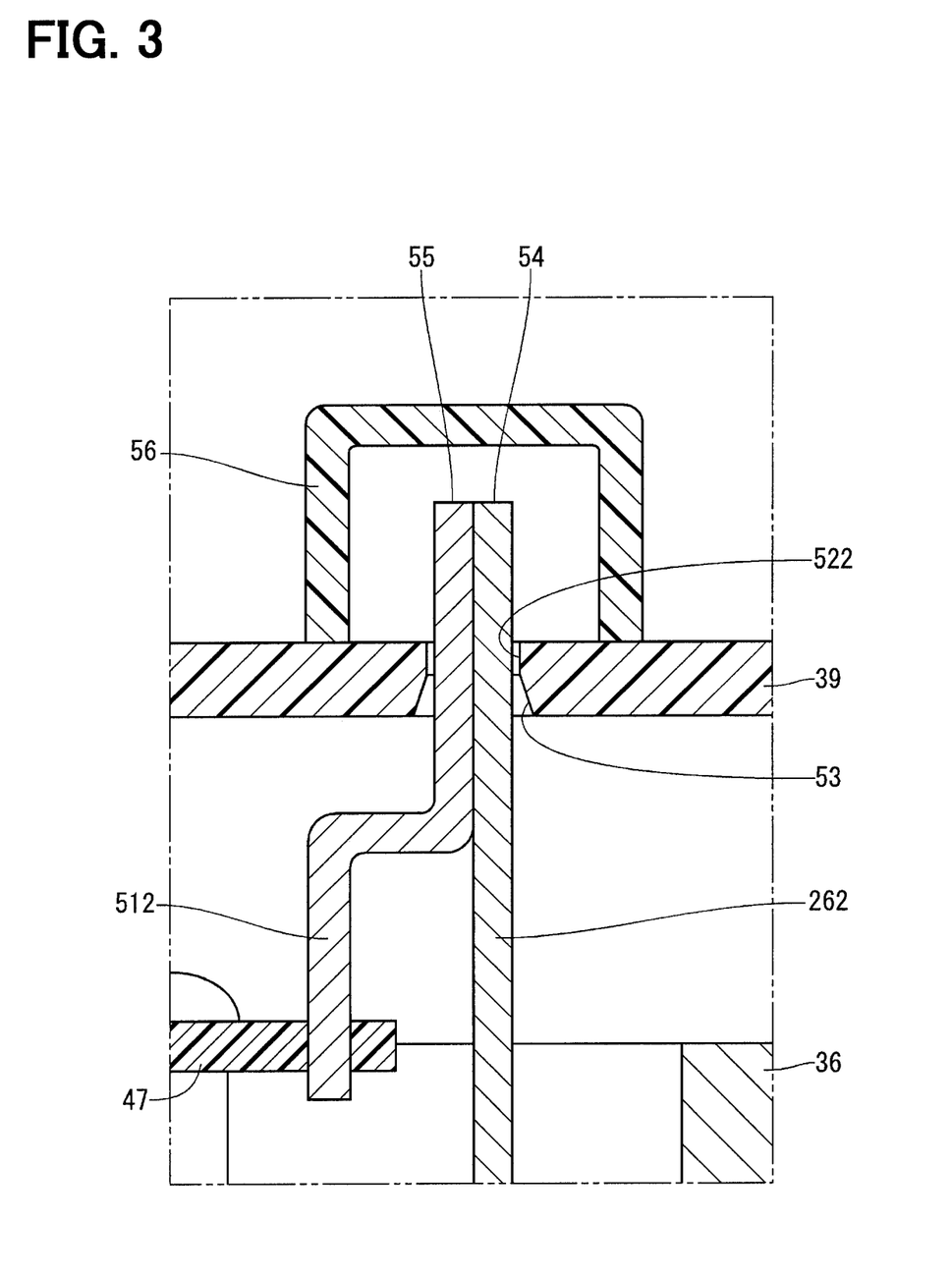
FIG. 3 is an enlarged view of an area III in FIG. 1.

Next, the characteristic structure of the drive device 10 will be described with reference to FIGS. 1 to 3.

Each of the phase windings of the coils 25 is connected to the circuit board 47 through the corresponding lead wire 26 and the corresponding terminal 51. Specifically, each of primary phase windings of the coils 25 is connected to the circuit board 47 through the corresponding lead wire 261 and the corresponding terminal 511. Each of secondary phase windings of the coils 25 is connected to the circuit board 47 through the corresponding lead wire 262 and the corresponding terminal 512. Each of third phase windings of the coils 25 is connected to the circuit board 47 through the corresponding lead wire 263 and the corresponding terminal 513.

Each of the lead wires 26 extends through both of the first frame end 36 and the cover 39. Each of the terminals 51 extends through the cover 39. The cover 39 includes: through-holes 521, through each of which the corresponding lead wire 261 and the corresponding terminal 511 extend; through-holes 522, through each of which the corresponding lead wire 262 and the corresponding terminal 512 extend; and through-holes 523, through each of which the corresponding lead wire 263 and the corresponding terminal 513 extend. Hereinafter, in a case were the through-holes 521, 522, 523 are not distinguished from each other, the through-holes 521, 522, 523 will be merely referred to as through-holes 52. A portion of an inner wall surface of each through-hole 52, which is located on the control unit 12 side, is a tapered surface 53 that has an inner diameter, which progressively increases toward the control unit 12.

One end 54 of each lead wire 26 and one end 55 of the corresponding terminal 51 project to an outside of the cover 39 and are electrically connected to each other by soldering.

The drive device 10 further includes shielding members 56, each of which is placed to an outer wall of the cover 39 such that the shielding member 56 shields the corresponding lead wires 26 and the corresponding terminals 51 from an outside space. In FIG. 2, each shielding member 56 is indicated by a dot-dot-dash line for the sake of convenience. Each shielding member 56 is shaped into a cup form and covers the one ends 54 of the corresponding lead wires 26 and the one ends 55 of the corresponding terminals 51 such that an opening end of the shielding member 56 is fixed to the cover 39 by, for example, bonding.

The drive device 10, which is constructed in the above described manner, is assembled through the following steps (1) to (6).

(1) The stator 21 and the rotor 22 are assembled to the housing 23. At this time, the lead wires 26 are arranged such that the lead wires 26 project from the first frame end 36 to the outside of the housing 23.

(2) The electronic components 41-46 and the terminals 51 are installed to the circuit board 47.

(3) The circuit board 47 is fixed to the first frame end 36.

(4) The cover 39 is installed to the first frame end 36. At this time, each lead wire 26 and the corresponding terminal 51 are inserted into the corresponding through-hole 52 of the cover 39, and the opening end of the cover 39 is assembled to and is fixed to the first frame end 36. The tapered surface 53 of each through-hole 52 functions as a guide portion that guides the corresponding lead wire 26 and the corresponding terminal 51 into the through-hole 52.

(5) The one end 54 of the corresponding lead wire 26 and the one end 55 of the corresponding terminal 51 are electrically connected with each other by soldering at the outside of the cover 39. At this time, the soldering is performed in a state where a gap between the lead wire 26 and the through-hole 52 is closed by a jig (not shown) that is in a form of a lid.

(6) The shielding members 56 are fixed to the cover 39.

Advantages

As described above, according to the first embodiment, the drive device 10 includes: the housing 23; the stator 21 that is fixed in the inside of the housing 23; the rotor 22 that is configured to be rotatable relative to the stator 21; the cover 39 that is installed to the outer wall of the housing 23; the control unit 12 that is installed in the inside of the cover 39 and controls the energization of the coils 25 of the stator 21; the terminals 51 that extend from the control unit 12 and extend through the cover 39; and the lead wires 26 that extend from the coils 25 and extend through the housing 23 and the cover 39. The lead wires 26 are electrically connected to the terminals 51, respectively, at the outside of the cover 39.

In the drive device 10, which is constructed in the above described manner, each of the lead wires 26 and the corresponding one of the terminals 51 can be connected together by, for example, soldering after the installation of the cover 39 to the housing 23. Here, at the time of connecting each lead wire 26 and the corresponding terminal 51 together, each lead wire insertion hole 38 of the housing 23 is shielded by the cover 39. Therefore, it is possible to limit the intrusion of solder debris, which is generated at the time of soldering, into the inside of the housing 23 through the lead wire insertion hole 38 without a need for providing a seal member at the lead wire insertion hole 38 of the housing 23. Since there is no need to provide the seal member, it is possible to improve the ease of assembly and to reduce the number of components. Since there is no need to provide the seal member at the lead wire insertion hole 38, it is possible to improve the ease of assembly and to reduce the number of components.

Second Embodiment

Figure 4:
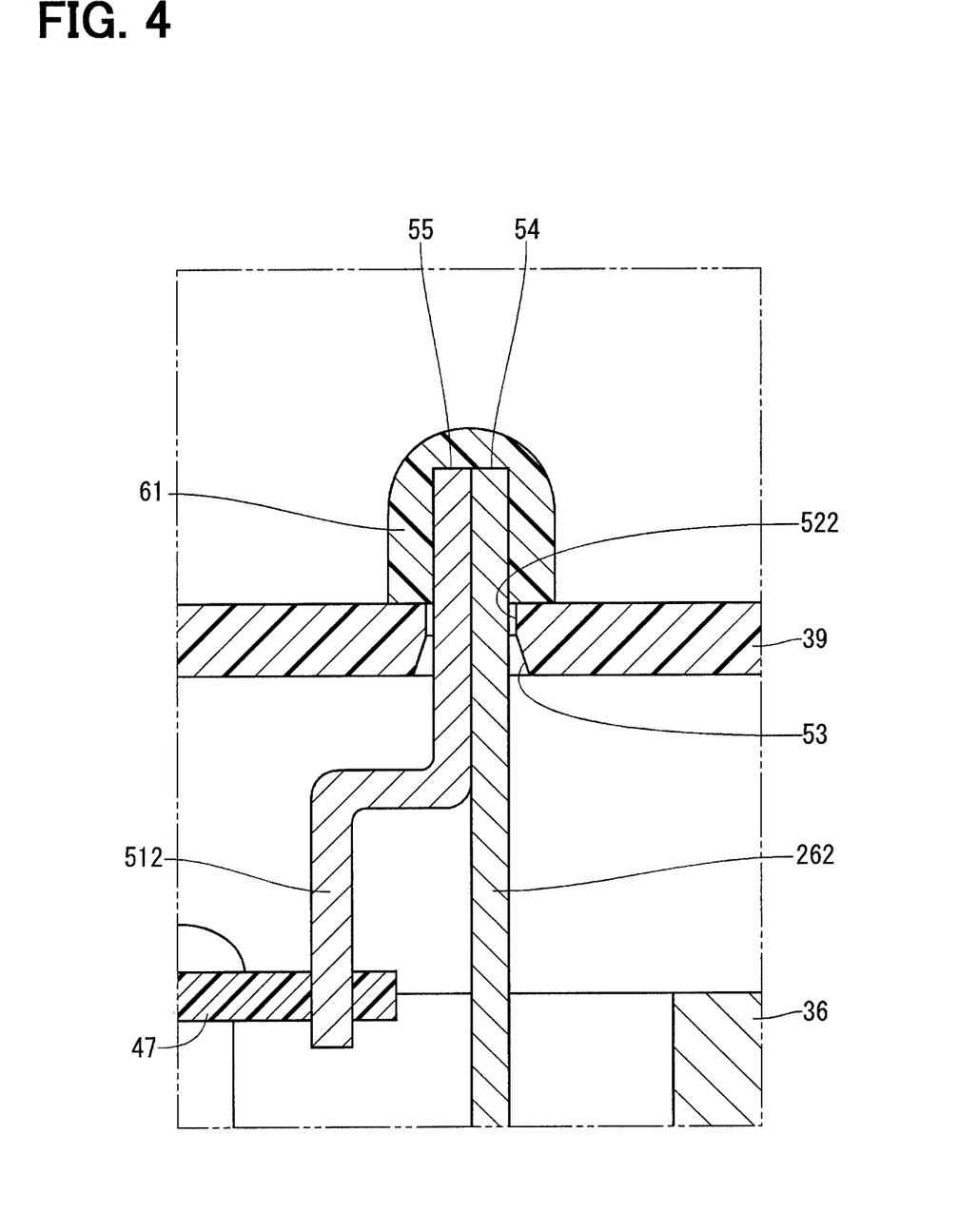
FIG. 4 is a cross-sectional view showing a connection between a lead wire and a terminal of a drive device according to a second embodiment of the present disclosure.

In a second embodiment of the present disclosure, as shown in FIG. 4, each shielding member 61 is made of resin that is fused to the one end 54 of the corresponding lead wire 26 and the one end 55 of the corresponding terminal 51. Specifically, the shielding member 61 is the resin that is adhered to the one ends 54, 55 in a molten state and is then solidified.

Third Embodiment

Figure 5:
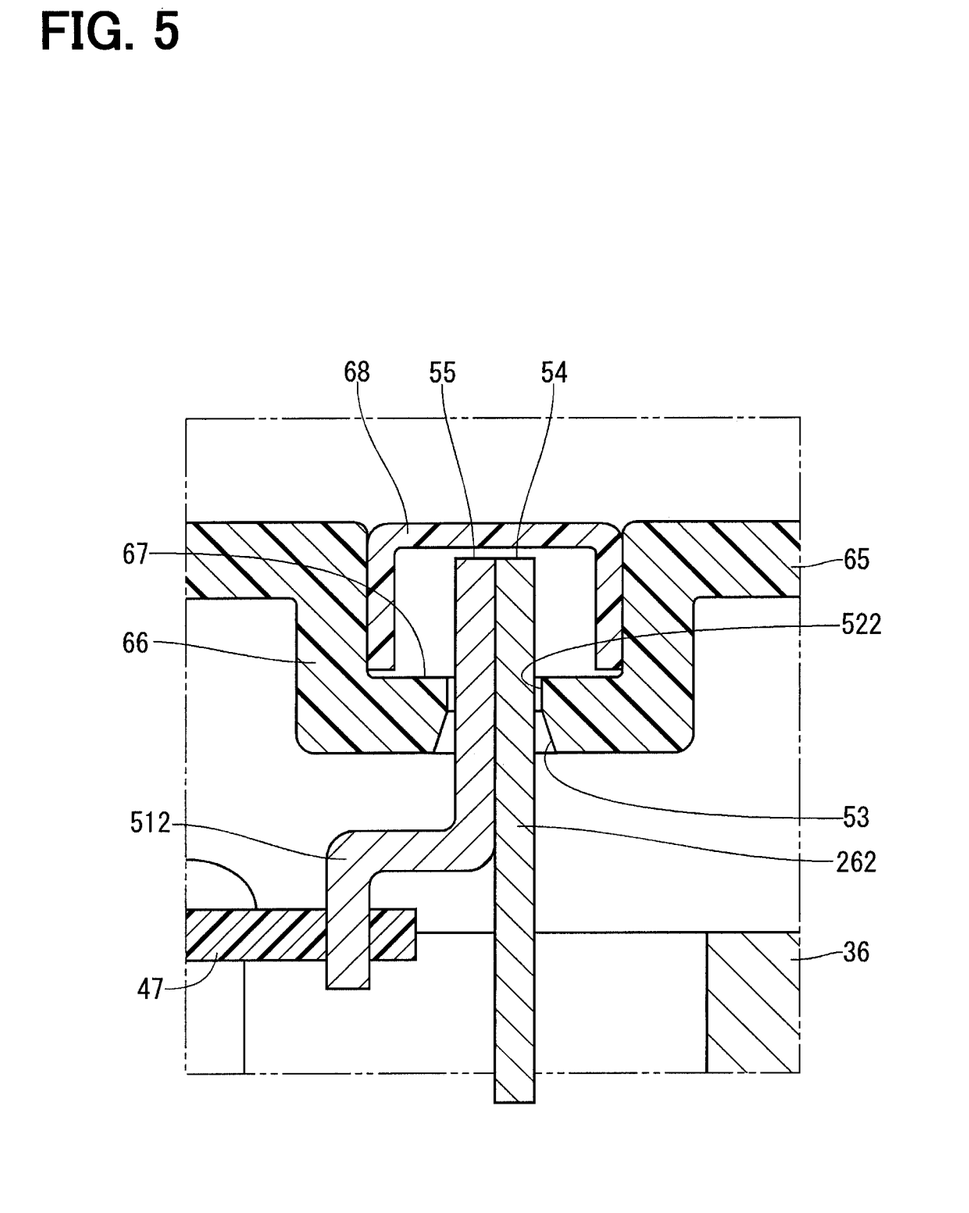
FIG. 5 is a cross-sectional view showing a connection between a lead wire and a terminal of a drive device according to a third embodiment of the present disclosure.

In a third embodiment of the present disclosure, as shown in FIG. 5, a cover 65 includes recessed portions 66 that are recessed toward the inside of the cover 65. Corresponding ones of the through-holes 52 are formed at a bottom of the corresponding recessed portion 66. The one ends 54 of the corresponding lead wires 26 and the one ends 55 of the corresponding terminals 51, which are placed at the outside of the cover 65, are contained within a recess 67 of the recessed portion 66. That is, the one ends 54, 55 do not project outward from the recess 67 of the recessed portion 66. A shielding member 68 is fitted into each of the recessed portions 66.

Since the one ends 54, 55 are contained within the recess 67 of the recessed portion 66 of the cover 65, each lead wire 26 and the corresponding terminal 51 can be connected together at the outside of the cover 65 without forming a projection at the cover 65.

Fourth Embodiment

Figure 6:
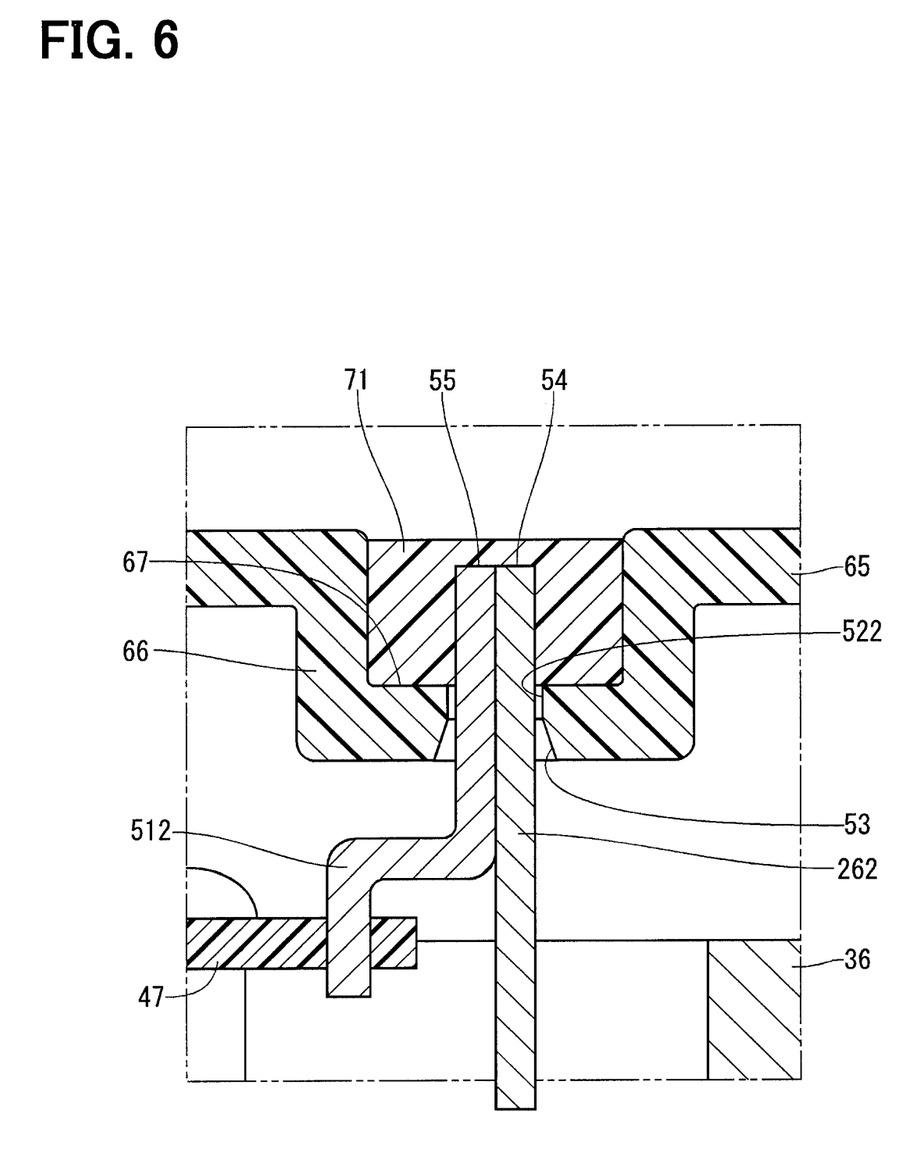
FIG. 6 is a cross-sectional view showing a connection between a lead wire and a terminal of a drive device according to a fourth embodiment of the present disclosure.

In a fourth embodiment of the present disclosure, as shown in FIG. 6, each shielding member 71 is made of resin, which is contained in the recess 67 of the corresponding recessed portion 66 and is fused to the one ends 55 of the corresponding lead wires 26 and the one ends 55 of the corresponding terminals 51.

Fifth Embodiment

Figure 7:
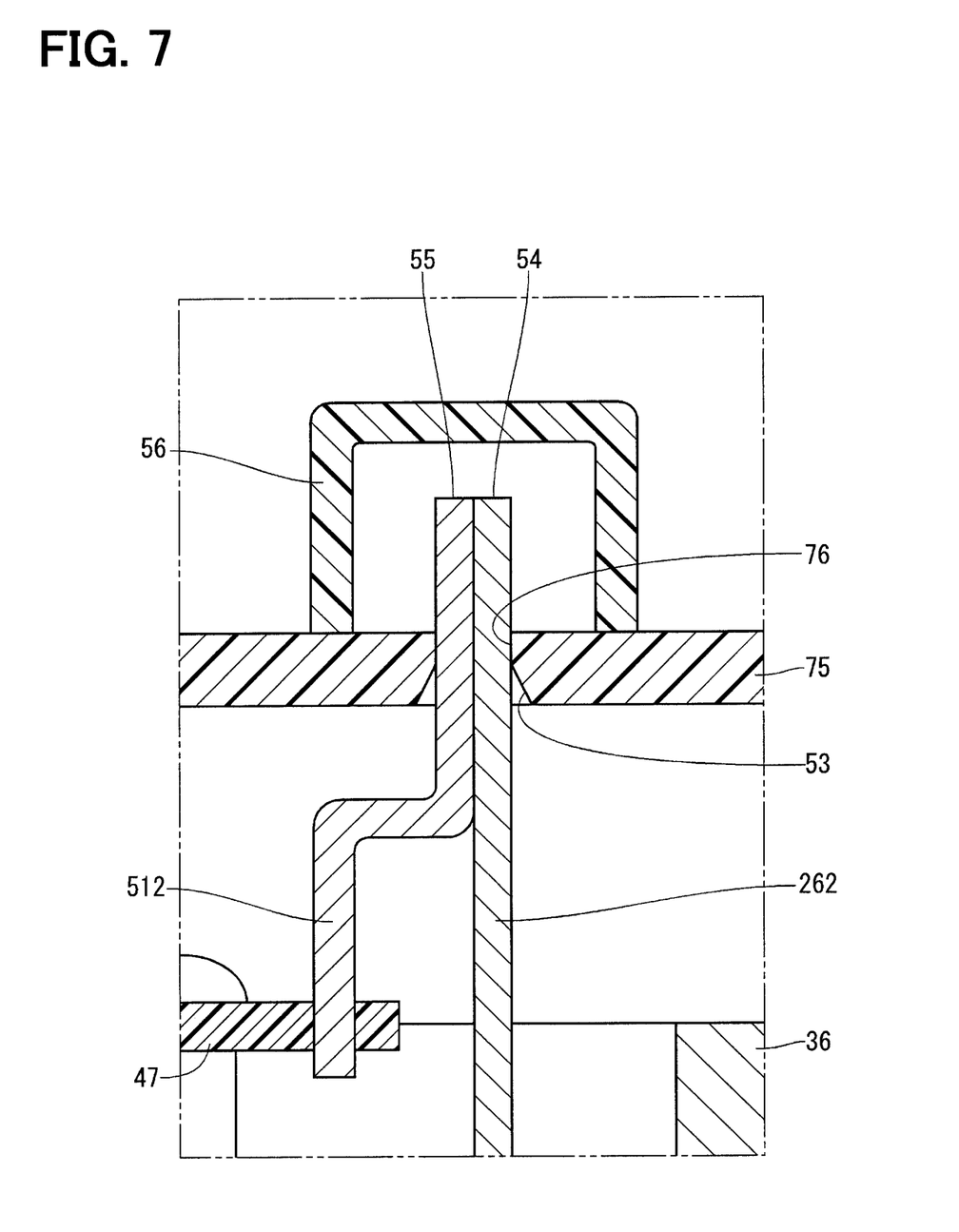
FIG. 7 is a cross-sectional view showing a connection between a lead wire and a terminal of a drive device according to a fifth embodiment of the present disclosure.

In a fifth embodiment of the present disclosure, as shown in FIG. 7, each of through-holes 76 of the cover 75 is formed to have substantially the same size as that of a combination of the one end 54 of the corresponding lead wire 26 and the one end 55 of the corresponding terminal 51. Therefore, at the time of soldering the corresponding lead wire 26 and the corresponding terminal 51 together, it is not required to close the through-hole 76 by the jig.

Sixth Embodiment

Figure 8:
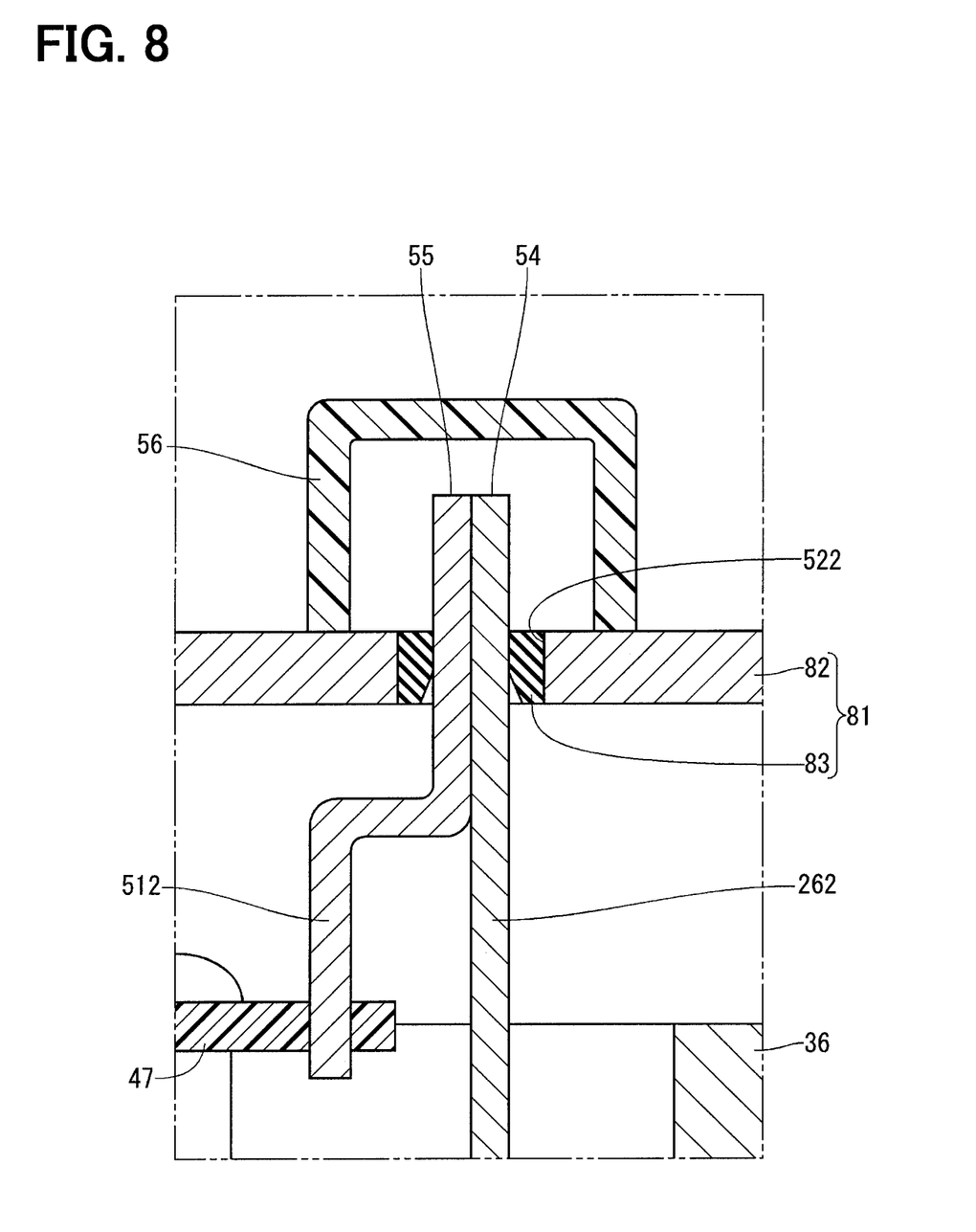
FIG. 8 is a cross-sectional view showing a connection between a lead wire and a terminal of a drive device according to a sixth embodiment of the present disclosure.

In a sixth embodiment of the present disclosure, as shown in FIG. 8, a cover 81 includes: a cover main body 82 that has the through-holes 52, through each of which the corresponding lead wire 26 and the corresponding terminal 51 are inserted; and elastic members 83, each of which is integrally joined to the inner wall surface of the corresponding through-hole 52 and contacts the corresponding lead wire 26 and the corresponding terminal 51 to close a gap of the through-hole 52. The cover main body 82 is made of metal. Each of the elastic members 83 is made of a material, such as rubber, which has relatively high elasticity.

Since the elastic member 83, which closes the gap between the through-hole 52 and each of the lead wire 26 and the terminal 51, is provided, it is not required to close the through-hole 52 by the jig at the time of soldering the lead wire 26 and the terminal 51 together. Furthermore, the cover main body 82 is made of the metal, so that the strength of the cover 81 can be improved, and the heat radiation performance can be enhanced.

OTHER EMBODIMENTS

In another embodiment of the present disclosure, each of the lead wire insertion holes of the housing may be formed to receive more than one (a plurality) of the lead wires.

In another embodiment of the present disclosure, each of the through-holes of the cover may be formed to receive more than one (a plurality) of the lead wires.

In another embodiment of the present disclosure, the shape of the cross section of each of the through-holes of the cover is not necessarily limited to the rectangular shape and may be changed to any other suitable shape, such as a circular shape.

In another embodiment of the present disclosure, the inner wall surface of each of the through-holes of the cover may not have the tapered surface. Alternatively, the entire inner wall surface of each of the through-holes of the cover may be a tapered surface.

In another embodiment of the present disclosure, each lead wire and the corresponding terminal may be overlapped with each other in a circumferential direction or any other direction.

In another embodiment of the present disclosure, the fixing method of the shielding member is not necessarily limited to the bonding, and another method, such as screwing or fitting, may be used to fix the shielding member.

In another embodiment of the present disclosure, the number of sets of three-phase coils of the motor may be one or three or more.

In another embodiment of the present disclosure, the drive device may be used to another apparatus that is other than the electric power steering apparatus.

The present disclosure should not be limited to the above embodiments and may be implemented in various other forms without departing from the principle of the present disclosure.

The invention claimed is:

1. A drive device comprising:
a housing;
a stator that is fixed in an inside of the housing;
a rotor that is configured to be rotatable relative to the stator;
a cover that is placed at an outside of the housing and is installed to an outer wall of the housing;
a control unit that is installed in an inside of the cover and controls energization of a coil of the stator;
a terminal that extends from the control unit and extends through the cover; and
a lead wire that extends from the coil and extends through the housing and the cover, wherein:
the lead wire is electrically connected to the terminal at an outside of the cover;
the coil is one of a first coil and a second coil of the stator;
the terminal is one of a first terminal, which extends from the control unit and corresponds to the first coil, and a second terminal, which extends from the control unit and corresponds to the second coil;
the lead wire is one of a first lead wire, which extends from the first coil and is electrically connected to the first terminal, and a second lead wire, which extends from the second coil and is electrically connected to the second terminal; and
the cover includes a first through-hole, through which the first terminal and the first lead wire extend, and a second through-hole, through which the second terminal and the second lead wire extend, and the second through-hole is spaced from the first through-hole.

2. The drive device according to claim 1, wherein the first through-hole is placed at a location that is opposite from the second through-hole about a position of a rotational center of the rotor.

3. The drive device according to claim 1, wherein:
the cover includes a recessed portion that is recessed toward the inside of the cover; and
one end of the lead wire, which is located at the outside of the cover, and one end of the terminal, which is located at the outside of the cover, are contained within a recess of the recessed portion.

4. The drive device according to claim 3, further comprising a shielding member that is placed in the recess such that the shielding member shields the lead wire and the terminal from an outside space.

5. The drive device according to claim 4, wherein the shielding member is contained within the recess.

6. The drive device according to claim 1, wherein the cover includes:
a cover main body that has the first through-hole and the second through-hole; and
a plurality of elastic members, each of which is joined to an inner wall surface or a peripheral edge part of a corresponding one of the first through-hole and the second through-hole and contacts a corresponding one of the first lead wire and the second lead wire such that the elastic member closes a gap between the corresponding one the first through-hole and the second through-hole and the corresponding one of the first lead wire and the second lead wire.

7. The drive device according to claim 6, wherein the cover main body is made of metal.

8. The drive device according to claim 1, wherein:
the control unit is fixed to the housing;
the first terminal and the first lead wire are inserted through the first through-hole in a common direction; and
the second terminal and the second lead wire are inserted through the second through-hole in a common direction.

9. The drive device according to claim 1, wherein each of the first through-hole and the second through-hole has a tapered surface that has an inner diameter, which progressively increases toward the control unit.

10. A drive device comprising:
a housing;
a stator that is fixed in an inside of the housing;
a rotor that is configured to be rotatable relative to the stator;
a cover that is placed at an outside of the housing and is installed to an outer wall of the housing;
a control unit that is installed in an inside of the cover and controls energization of a coil of the stator;
a terminal that extends from the control unit and extends through the cover; and
a lead wire that extends from the coil and extends through the housing and the cover, wherein:
the lead wire is electrically connected to the terminal at an outside of the cover;
the cover includes a recessed portion that is recessed toward the inside of the cover;
one end of the lead wire, which is located at the outside of the cover, and one end of the terminal, which is located at the outside of the cover, are contained within a recess of the recessed portion; and the drive device further comprises a shielding member that is placed in the recess such that the shielding member shields the lead wire and the terminal from an outside space.

11. The drive device according to claim 10, wherein the shielding member is contained within the recess.

12. The drive device according to claim 10, wherein the cover includes:

a cover main body that has a through-hole, through which at least the lead wire extend; and an elastic member that is joined to an inner wall surface or a peripheral edge part of the through-hole and contacts the lead wire such that the elastic member closes a gap between the through-hole and the lead wire.

13. The drive device according to claim 12, wherein the cover main body is made of metal.

14. The drive device according to claim 12, wherein:

the control unit is fixed to the housing; and the terminal and the lead wire are inserted through the through-hole in a common direction.

15. The drive device according to claim 12, wherein the through-hole has a tapered surface that has an inner diameter, which progressively increases toward the control unit.

* * * * *